United States Patent
Arimatsu

(10) Patent No.: US 11,654,491 B2
(45) Date of Patent: May 23, 2023

(54) PRECISION MACHINE TOOL

(71) Applicant: FANUC CORPORATION, Yamanashi (JP)

(72) Inventor: Yohei Arimatsu, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 444 days.

(21) Appl. No.: 16/747,872

(22) Filed: Jan. 21, 2020

(65) Prior Publication Data
US 2020/0238389 A1    Jul. 30, 2020

(30) Foreign Application Priority Data
Jan. 25, 2019    (JP) ............................ JP2019-011735

(51) Int. Cl.
| | |
|---|---|
| *B23B 7/10* | (2006.01) |
| *B23Q 17/24* | (2006.01) |
| *B23B 1/00* | (2006.01) |
| *B23Q 1/64* | (2006.01) |
| *B23Q 1/26* | (2006.01) |
| *B23Q 5/00* | (2006.01) |
| *G05B 19/18* | (2006.01) |

(Continued)

(52) U.S. Cl.
CPC ............ *B23B 1/00* (2013.01); *B23B 7/10* (2013.01); *B23Q 1/26* (2013.01); *B23Q 1/64* (2013.01); *B23Q 1/72* (2013.01); *B23Q 5/00* (2013.01); *B23Q 17/24* (2013.01); *B23Q 17/2404* (2013.01); *B23Q 17/2409* (2013.01); *G05B 19/182* (2013.01); *H04N 23/61* (2023.01); *H04N 23/62* (2023.01)

(58) Field of Classification Search
CPC ......... B23B 1/00; B23B 7/10; B23Q 17/2404; B23Q 17/2409; B23Q 1/26; B23Q 1/64; B23Q 1/72; B23Q 5/00; H04N 5/2251; H04N 5/2256; H04N 5/23216; H04N 5/23218; H04N 5/23299; H04N 7/183
See application file for complete search history.

(56) References Cited

U.S. PATENT DOCUMENTS

| | | | | |
|---|---|---|---|---|
| 5,201,145 A | * | 4/1993 | Ibe ..................... | B24B 41/062 |
| | | | | 451/6 |
| 5,348,431 A | * | 9/1994 | Kusunoki ............ | B23Q 17/24 |
| | | | | 83/13 |

(Continued)

FOREIGN PATENT DOCUMENTS

| | | |
|---|---|---|
| JP | 08294849 A | 11/1996 |
| JP | 2005138188 A | 6/2005 |

(Continued)

OTHER PUBLICATIONS

AMETEK Precitech, Inc. Multi-Axis Machining System Nanform 700 Ultra Brochure (Year: 2022).*

(Continued)

*Primary Examiner* — Nicole N Ramos
(74) *Attorney, Agent, or Firm* — Fredrikson & Byron, P.A.

(57) ABSTRACT

A precision machine tool includes: a tool support for supporting a tool; a tool table serving as a moving mechanism capable of moving the tool support; and one or multiple imaging devices fixed to the tool support, the imaging devices each having an imaging unit configured to capture the image of a machining point on a workpiece machined by the tool.

9 Claims, 9 Drawing Sheets

(51) Int. Cl.
*B23Q 1/72* (2006.01)
*H04N 23/61* (2023.01)
*H04N 23/62* (2023.01)

(56) References Cited

U.S. PATENT DOCUMENTS

| | | | | | |
|---|---|---|---|---|---|
| 5,392,502 | A | * | 2/1995 | Freer | G05B 19/425 82/158 |
| 5,619,031 | A | * | 4/1997 | Choate | G02B 27/34 348/136 |
| 5,663,802 | A | * | 9/1997 | Beckett | G05B 19/401 358/3.29 |
| 5,802,937 | A | * | 9/1998 | Day | B23B 25/06 82/134 |
| 5,906,460 | A | * | 5/1999 | Link | G05B 19/402 409/80 |
| 6,273,783 | B1 | * | 8/2001 | Kim | B23Q 3/186 451/287 |
| 6,830,415 | B2 | * | 12/2004 | Shiba | B23Q 11/0042 144/356 |
| 7,107,694 | B2 | * | 9/2006 | Yang | G01Q 30/04 33/553 |
| 8,393,836 | B2 | * | 3/2013 | Wang | B23Q 15/22 409/16 |
| 8,443,704 | B2 | * | 5/2013 | Burke | G02B 5/1852 82/131 |
| 8,522,654 | B2 | * | 9/2013 | Akiyama | B23Q 17/22 82/47 |
| 8,574,139 | B2 | * | 11/2013 | Honegger | B23Q 1/012 409/134 |
| 8,806,995 | B2 | * | 8/2014 | Kapoor | B26D 3/08 82/134 |
| 8,953,034 | B1 | * | 2/2015 | Milosevic | G01N 21/8806 348/92 |
| 2004/0069944 | A1 | * | 4/2004 | Massie | G01Q 10/04 250/306 |
| 2005/0223858 | A1 | * | 10/2005 | Lu | B23B 1/00 82/173 |
| 2006/0035776 | A1 | * | 2/2006 | Duncan | A61C 13/0004 483/30 |
| 2006/0188127 | A1 | * | 8/2006 | Reilley | B23Q 17/24 382/100 |
| 2006/0188351 | A1 | * | 8/2006 | Wang | B23Q 17/0976 409/141 |
| 2007/0107565 | A1 | * | 5/2007 | Campbell | B23B 29/125 82/12 |
| 2007/0107567 | A1 | * | 5/2007 | Ehnes | B23Q 15/14 82/12 |
| 2008/0101881 | A1 | * | 5/2008 | Hon | G05B 19/404 409/214 |
| 2009/0314146 | A1 | | 12/2009 | Shen | |
| 2010/0050832 | A1 | | 3/2010 | Kim et al. | |
| 2010/0242693 | A1 | * | 9/2010 | Akiyama | B23Q 17/09 82/118 |
| 2010/0246900 | A1 | * | 9/2010 | Ge | B23Q 17/24 382/107 |
| 2010/0278606 | A1 | * | 11/2010 | Hyatt | B23C 3/18 29/27 R |
| 2011/0027032 | A1 | * | 2/2011 | Keller | B24B 13/046 409/219 |
| 2014/0260841 | A1 | * | 9/2014 | Honegger | H02K 7/14 409/145 |
| 2014/0340572 | A1 | * | 11/2014 | Sato | H04N 5/225 348/370 |
| 2016/0266373 | A1 | * | 9/2016 | Sakai | G02B 23/2446 |
| 2018/0015578 | A1 | * | 1/2018 | Ravindra | B23K 26/064 |
| 2018/0106595 | A1 | * | 4/2018 | Christoph | G01B 11/245 |
| 2018/0222004 | A1 | * | 8/2018 | Jacot | B23Q 17/24 |

FOREIGN PATENT DOCUMENTS

| | | |
|---|---|---|
| JP | 201058263 A | 3/2010 |
| JP | 2013122956 A | 6/2013 |
| WO | 2015087411 A1 | 6/2015 |

OTHER PUBLICATIONS

English Abstract and Machine Translation for Japanese Publication No. JPH08-294849A, published Nov. 12, 1996, 9 pgs.
English Abstract and Machine Translation for Japanese Publication No. JP2005-138188A, published Jun. 2, 2005, 10 pgs.
English Abstract for Japanese Publication No. 2010058263 A, published Mar. 18, 2010, 2 pgs.
English Abstract and Machine Translation for Japanese Publication No. JP2013-122956A, published Jun. 20, 2013, 11 pgs.
English Abstract and Machine Translation for International Publication No. WO2015/087411A1, published Jun. 18, 2015, 18 pgs.

* cited by examiner

FIG. 4

IN THE CASE OF IMAGE HAVING ASPECT RATIO OF 16:9

| FIELD ANGLE θ [deg] | 30 | LENGTH PER DOT [mm] ON THE LONG SIDE | | |
|---|---|---|---|---|
| OBJECT DISTANCE D [mm] | | HD (1.56 MEGA PIXELS) NUMBER OF DOTS ON THE LONG SIDE 1440 | FHD (2.07 MEGA PIXELS) NUMBER OF DOTS ON THE LONG SIDE 1920 | 4K (8.29 MEGA PIXELS) NUMBER OF DOTS ON THE LONG SIDE 3840 |
| 10 | | 0.003 | 0.002 | 0.001 |
| 20 | | 0.006 | 0.005 | 0.002 |
| 30 | | 0.010 | 0.007 | 0.004 |
| 40 | | 0.013 | 0.010 | 0.005 |
| 50 | | 0.016 | 0.012 | 0.006 |
| 60 | | 0.019 | 0.015 | 0.007 |
| 70 | | 0.023 | 0.017 | 0.008 |
| 80 | | 0.026 | 0.019 | 0.010 |
| 90 | | 0.029 | 0.022 | 0.011 |
| 100 | | 0.032 | 0.024 | 0.012 |

FIG. 5

IN THE CASE OF IMAGE HAVING ASPECT RATIO OF 1:1

| FIELD ANGLE θ [deg] | 30 | LENGTH PER DOT [mm] ON THE LONG SIDE | | |
|---|---|---|---|---|
| OBJECT DISTANCE D [mm] | | 1 MEGA PIXELS NUMBER OF DOTS ON EACH SIDE 1000 | 2 MEGA PIXELS NUMBER OF DOTS ON EACH SIDE 1414 | 8 MEGA PIXELS NUMBER OF DOTS ON EACH SIDE 2828 |
| 10 | | 0.004 | 0.003 | 0.001 |
| 20 | | 0.008 | 0.005 | 0.003 |
| 30 | | 0.011 | 0.008 | 0.004 |
| 40 | | 0.015 | 0.011 | 0.005 |
| 50 | | 0.019 | 0.013 | 0.007 |
| 60 | | 0.023 | 0.016 | 0.008 |
| 70 | | 0.027 | 0.019 | 0.009 |
| 80 | | 0.030 | 0.021 | 0.011 |
| 90 | | 0.034 | 0.024 | 0.012 |
| 100 | | 0.038 | 0.027 | 0.013 |

FIG. 6

IN THE CASE OF IMAGE HAVING ASPECT RATIO OF 16:9

| FIELD ANGLE θ [deg] | 45 | | |
|---|---|---|---|
| | LENGTH PER DOT [mm] ON THE LONG SIDE | | |
| OBJECT DISTANCE D [mm] | HD (1.56 MEGA PIXELS) NUMBER OF DOTS ON THE LONG SIDE 1440 | FHD (2.07 MEGA PIXELS) NUMBER OF DOTS ON THE LONG SIDE 1920 | 4K (8.29 MEGA PIXELS) NUMBER OF DOTS ON THE LONG SIDE 3840 |
| 10 | 0.005 | 0.004 | 0.002 |
| 20 | 0.010 | 0.008 | 0.004 |
| 30 | 0.015 | 0.011 | 0.006 |
| 40 | 0.020 | 0.015 | 0.008 |
| 50 | 0.025 | 0.019 | 0.009 |
| 60 | 0.030 | 0.023 | 0.011 |
| 70 | 0.035 | 0.026 | 0.013 |
| 80 | 0.040 | 0.030 | 0.015 |
| 90 | 0.045 | 0.034 | 0.017 |
| 100 | 0.050 | 0.038 | 0.019 |

FIG. 7

IN THE CASE OF IMAGE HAVING ASPECT RATIO OF 1:1

| FIELD ANGLE θ [deg] | 45 | | | |
|---|---|---|---|---|
| | | LENGTH PER DOT [mm] ON THE LONG SIDE | | |
| OBJECT DISTANCE D [mm] | | 1 MEGA PIXELS NUMBER OF DOTS ON EACH SIDE 1000 | 2 MEGA PIXELS NUMBER OF DOTS ON EACH SIDE 1414 | 8 MEGA PIXELS NUMBER OF DOTS ON EACH SIDE 2828 |
| 10 | | 0.006 | 0.004 | 0.002 |
| 20 | | 0.012 | 0.008 | 0.004 |
| 30 | | 0.018 | 0.012 | 0.006 |
| 40 | | 0.023 | 0.017 | 0.008 |
| 50 | | 0.029 | 0.021 | 0.010 |
| 60 | | 0.035 | 0.025 | 0.012 |
| 70 | | 0.041 | 0.029 | 0.014 |
| 80 | | 0.047 | 0.033 | 0.017 |
| 90 | | 0.053 | 0.037 | 0.019 |
| 100 | | 0.059 | 0.041 | 0.021 |

FIG. 8

IN THE CASE OF IMAGE HAVING ASPECT RATIO OF 16:9

| FIELD ANGLE θ [deg] | 60 | LENGTH PER DOT [mm] ON THE LONG SIDE | | |
|---|---|---|---|---|
| | OBJECT DISTANCE D [mm] | HD (1.56 MEGA PIXELS) NUMBER OF DOTS ON THE LONG SIDE 1440 | FHD (2.07 MEGA PIXELS) NUMBER OF DOTS ON THE LONG SIDE 1920 | 4K (8.29 MEGA PIXELS) NUMBER OF DOTS ON THE LONG SIDE 3840 |
| | 10 | 0.007 | 0.005 | 0.003 |
| | 20 | 0.014 | 0.010 | 0.005 |
| | 30 | 0.021 | 0.016 | 0.008 |
| | 40 | 0.028 | 0.021 | 0.010 |
| | 50 | 0.035 | 0.026 | 0.013 |
| | 60 | 0.042 | 0.031 | 0.016 |
| | 70 | 0.049 | 0.037 | 0.018 |
| | 80 | 0.056 | 0.042 | 0.021 |
| | 90 | 0.063 | 0.047 | 0.024 |
| | 100 | 0.070 | 0.052 | 0.026 |

FIG. 9

IN THE CASE OF IMAGE HAVING ASPECT RATIO OF 1:1

| FIELD ANGLE θ [deg] | 60 | | | |
|---|---|---|---|---|
| | | LENGTH PER DOT [mm] ON THE LONG SIDE | | |
| | OBJECT DISTANCE D [mm] | 1 MEGA PIXELS NUMBER OF DOTS ON EACH SIDE 1000 | 2 MEGA PIXELS NUMBER OF DOTS ON EACH SIDE 1414 | 8 MEGA PIXELS NUMBER OF DOTS ON EACH SIDE 2828 |
| | 10 | 0.008 | 0.006 | 0.003 |
| | 20 | 0.016 | 0.012 | 0.006 |
| | 30 | 0.024 | 0.017 | 0.009 |
| | 40 | 0.033 | 0.023 | 0.012 |
| | 50 | 0.041 | 0.029 | 0.014 |
| | 60 | 0.049 | 0.035 | 0.017 |
| | 70 | 0.057 | 0.040 | 0.020 |
| | 80 | 0.065 | 0.046 | 0.023 |
| | 90 | 0.073 | 0.052 | 0.026 |
| | 100 | 0.082 | 0.058 | 0.029 |

PRECISION MACHINE TOOL

CROSS-REFERENCE TO RELATED APPLICATION

This application is based upon and claims the benefit of priority from Japanese Patent Application No. 2019-011735 filed on Jan. 25, 2019, the contents of which are incorporated herein by reference.

BACKGROUND OF THE INVENTION

Field of the Invention

The present invention relates to a precision machine tool that uses a tool to perform precision machining on a workpiece in accordance with machining commands including machining accuracy in the order of 10 nanometers or less.

Description of the Related Art

Japanese Laid-Open Patent Publication No. 2010-058263 discloses a precision machine tool that machines a workpiece in accordance with a surface roughness in the order of nanometer. In this precision machine tool, in order to minimize errors due to thermal displacement, the main structure is configured to be symmetrical with respect to the machining point.

SUMMARY OF THE INVENTION

Also, in precision machining with precision machine tools, it is often necessary to perform machining on a workpiece by detailedly observing the state of the machining point of the tool on the workpiece to grasp the machining conditions. In this case, it has been a common practice that the operator brings their face close to the machining point for visual observation. However, visual observation puts the operator in jeopardy, such as chips generated by machining getting in the eyes, the operator's head colliding with the machine, the operator's body contacting the tool unexpectedly and others.

It is therefore an object of the present invention to provide a precision machine tool excellent in safety.

An aspect of the present invention resides in a precision machine tool that uses a tool to perform precision machining a workpiece in accordance with a machining command including machining accuracy in the order of 10 nanometers or less, including: a tool support configured to support the tool; a moving mechanism configured to move the tool support; and one or a plurality of imaging devices fixed to the tool support or the moving mechanism, the imaging devices each having an imaging unit configured to capture the image of a machining point on the workpiece machined by the tool.

According to the present invention, it is possible to capture the image of machining point by single or multiple imaging devices without changing the relative position of the imaging device to the tool supported by the tool support even if the tool support is moved as the moving mechanism moves. As a result, the operator can observe the machining point without getting close to the machining point, which provides excellent safety.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a table (1) representing calculations of an object length per dot in an image;

FIG. 5 is a table (2) representing calculations of an object length per dot in an image;

FIG. 6 is a table (3) representing calculations of an object length per dot in an image;

FIG. 7 is a table (4) representing calculations of an object length per dot in an image;

FIG. 8 is a table (5) representing calculations of an object length per dot in an image; and FIG. 9 is a table (6) representing calculations of an object length per dot in an image.

DESCRIPTION OF THE PREFERRED EMBODIMENTS

The present invention will be detailed below by describing a preferred embodiment with reference to the accompanying drawings.

Embodiment

Figure 1:
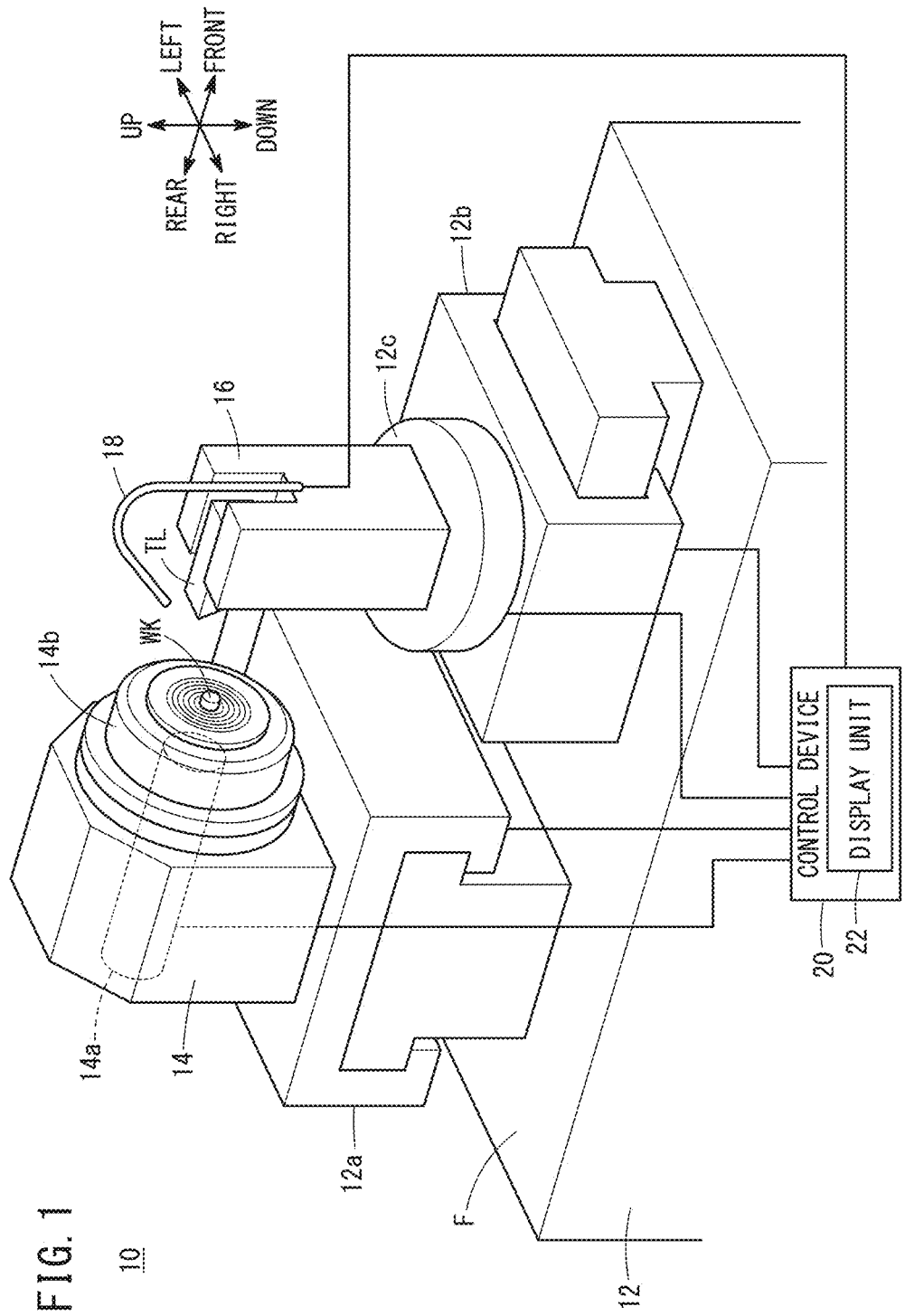
FIG. 1 is a schematic diagram showing a configuration of a precision machine tool of the present embodiment.

FIG. 1 is a schematic diagram showing a configuration of a precision machine tool 10 according to the present embodiment. The precision machine tool 10 precisely machines a workpiece WK by means of a tool TL in accordance with to machining commands including machining accuracy in the order of 10 nanometers or less. In the present embodiment, the precision machine tool 10 is a lathe machine that performs machining by bringing the rotating workpiece WK into contact with the tool TL.

The precision machine tool 10 includes a base bed 12, a spindle stock 14, a tool support 16, an imaging device 18 and a control device 20.

The base bed 12 is a pedestal for the spindle stock 14 and the tool support 16. In FIG. 1, the direction (axial direction) in which a spindle shaft 14a of the spindle stock 14 extends is referred to as the front-rear direction, the direction parallel to a placement surface F of the base bed 12 and orthogonal to the axial direction is referred to as the left-right direction, and the direction perpendicular to the placement surface F and the axial direction is referred to as the up-down direction. The downward direction is the direction in which gravity acts.

A spindle table 12a as a moving mechanism capable of moving the spindle stock 14 is arranged on the placement surface F of the base bed 12. The spindle table 12a can move the spindle stock 14 in the left-right direction relative to the base bed 12. The spindle stock 14 is placed on the spindle table 12a.

Also, a tool table 12b and a rotary table 12c as a moving mechanism capable of moving the tool support 16 are arranged on the placement surface F of the base bed 12. The tool table 12b can move the tool support 16 in the front-rear direction relative to the base bed 12, and the rotary table 12c is placed on the tool table 12b. The rotary table 12c can rotate about a vertical axis (along the up-down direction) as a rotation axis, and the tool support 16 is placed on the rotary table 12c. Incidentally, the rotary table 12c can be omitted.

The spindle stock 14 is a workpiece support for supporting a workpiece WK, and includes a spindle shaft 14a extending in the front-rear direction and a rotor 14b provided at one end (front end) of the spindle shaft 14a. The workpiece WK is fixed to the rotor 14b on the front face of the rotor 14b by an unillustrated fixture. That is, the spindle stock 14 supports the workpiece WK in a rotatable manner.

The tool support 16 is a tool support for supporting a tool TL, and is formed in a column shape extending upward from the upper surface of the rotary table 12c. The tool TL is fixed to the upper end of the tool support 16 by an unillustrated fixture. The tool TL fixed to the tool support 16 extends in a direction substantially orthogonal to the direction in which the tool support 16 extends.

The imaging device 18 takes an image of an object and outputs an image signal representing the image obtained as an imaging result, to the control device 20. The control device 20 includes a display unit 22, and displays on the display unit 22 the image rendered by the image signal output from the imaging device 18.

The control device 20 has a machining program for machining the workpiece WK using the tool TL. The control device 20 appropriately controls the spindle shaft 14a of the spindle stock 14 and the moving mechanism (spindle table 12a, tool table 12b and rotary table 12c) in accordance with machining commands including machining accuracy in the order of 10 nanometers or less specified by the machining program.

Specifically, for example, the control device 20 moves the spindle table 12a and the tool table 12b of the tool support 16 relatively while turning the spindle shaft 14a of the spindle stock 14 so as to perform machining on the machining point specified by the machining program. As the spindle table 12a and the tool table 12b are moved relatively to each other, the tool TL fixed to the tool support 16 on the tool table 12b is pressed against the workpiece WK supported by the spindle stock 14 on the spindle table 12a, to thereby machine the workpiece WK.

Figure 2:
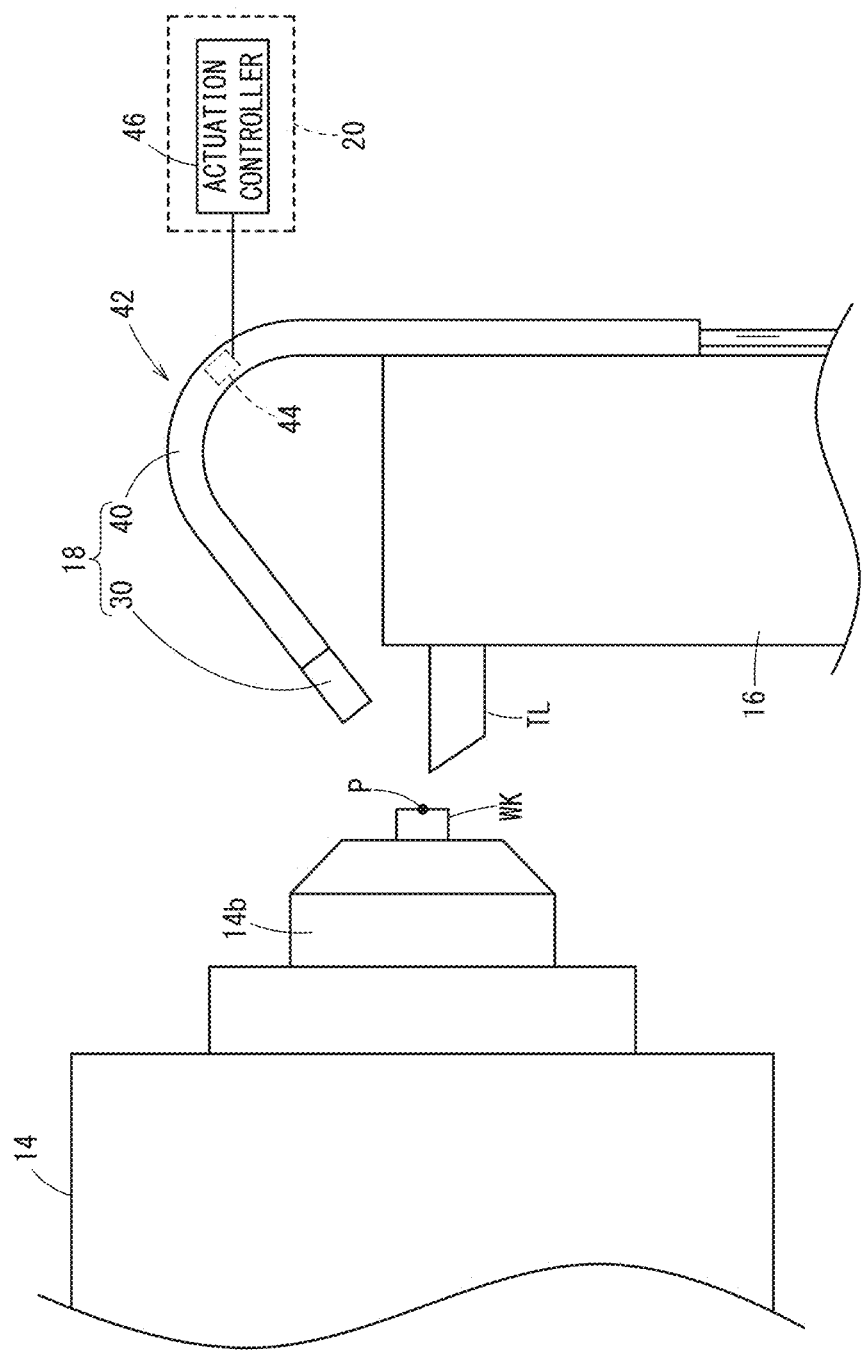
FIG. 2 is a diagram illustrating a state in which an imaging device is attached.

FIG. 2 is a diagram illustrating a state in which the imaging device 18 is attached. The imaging device 18 takes the image of the machining point P on the workpiece WK machined by the tool TL. This machining point P is specified by the machining program. The imaging device 18 has a hollow rod shape and is flexible. That is, the imaging device 18 is formed in a flexible tubular shape, and at least one of the ends of the imaging device 18 formed in a tubular shape is closed.

Figure 3:
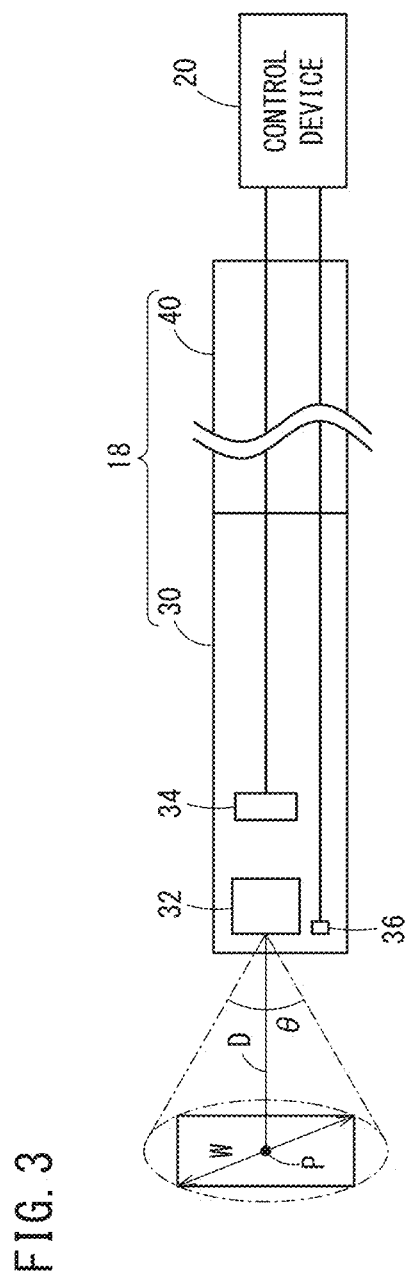
FIG. 3 is a diagram illustrating a configurational example of an imaging unit.

The imaging device 18 includes an imaging unit 30 and a supporting part 40. The imaging unit 30 is located at the front end of the imaging device 18. FIG. 3 is a diagram illustrating a configurational example of the imaging unit 30.

The imaging unit 30 includes at least an objective lens 32, an image sensor 34, and an illuminator 36. The objective lens 32 is a lens that focuses light entering the front end of the imaging unit 30 from the object to create an image of the object.

The image sensor 34 captures the image created by the objective lens 32, and an image focused by the objective lens 32 is formed on the imaging surface of the image sensor 34. The signal line from the image sensor 34 is connected to the control device 20 through a pipe of the imaging device 18. One or more lenses other than the objective lens 32 may be arranged between the image sensor 34 and the objective lens 32. In this case, the image created by the objective lens 32 becomes an intermediate image, which is focused on the imaging surface of the image sensor 34 by one or more lenses other than the objective lens 32.

The control device 20, based on the image signal output from the imaging device 18, displays at least one of the image containing the machining point P of the tool TL on the workpiece WK and an enlarged image of a specified region in the aforementioned image, on the display unit 22. Thus, the operator can monitor the machining point P without visual observation by bringing him/herself close to the machining point P.

It should be noted that in the field of fine machining such as ultra-precision machining, it is important to observe delicate tool contact of the cutting edge of the tool TL. When the operator visually observes the machining point P, generally, the operator becomes able to visually recognize and grasp the processing state of the machining point P from the shape and characteristics of chips when the size of the chips collected on the tool TL while machining the machining point P becomes about 0.3 mm to 0.5 mm.

As shown in FIG. 3, when the linear distance (hereinafter referred to as the object distance) from a predetermined portion of the imaging unit 30, such as the front end of the imaging unit 30 or the principal point of the objective lens 32, to the machining point P is denoted by D mm (millimeters), the field angle of the imaging unit 30 (the angle of view of the objective lens 32) is denoted by θ [deg] (degrees), and the imaging width that can be captured as an image by the imaging unit 30 is denoted by W mm (millimeters), a relationship "W=2×D×tan(θ/2)" holds from the Right Triangle Formula. The imaging width W is the diagonal length of a predetermined rectangular area in the field of view of the objective lens 32, and the rectangular area corresponds to an imaging range that can be picked up by the image sensor 34. That is, the imaging width W is the length of the diagonal line of the area corresponding to the rectangular imaging area focused on the image sensor 34 in the field of view of the objective lens 32.

At this point, it is preferable that the following relationship is satisfied:

$$\frac{2 \times D \times \tan\left(\frac{\theta}{2}\right)}{R_{sa}} \cdot \frac{1}{\sqrt{1+x^2}} \leq 0.03 \, [\text{mm}] \quad (1)$$

where x is the ratio of the short side to the long side of the rectangular area corresponding to an image taken by the image sensor 34 of the imaging unit 30 when the long side is defined as 1, and Rsa is the number of dots (number of pixels) of the long side in the image.

The left side of Inequality (1) corresponds to the size of the object per dot in the captured image. As described above, when the operator visually observes the machining point P, the minimum size of chips that can be visually recognized is 0.3 mm. Therefore, it is expected that an object (machining point P) made up of roughly ten dots can be observed. That is, Inequality (1) indicates that the machining point P can be observed with a resolution equal to or higher than that of visual observation if the resolution is 0.03 mm or less.

FIG. 4 is a table (1) representing calculations of the length of an object per dot in the image. In FIG. 4, the object length per dot in the image is calculated using Inequality (1) when the field angle θ is fixed at 30 [deg], the ratio between the long side and the short side of the image captured by the image sensor 34 is fixed at 16:9, and the number of dots Rsa on the long side of the image and the object distance D are varied.

In the table, "HD" corresponds to the high-definition image of terrestrial digital broadcasting, and the number of dots Rsa on the long side of the image is 1440. "FHD" in the table corresponds to the full high-definition image, and the number of dots Rsa on the long side of the image is 1920. "4K" in the table corresponds to the UHDTV image, and the number of dots Rsa on the long side of the image is 3840.

For example, when the field angle θ is 30 [deg] and the number of dots Rsa on the long side of the image captured by the image sensor 34 is 1440, if the object distance D is less than 90 mm, it can be seen from the calculations in the table in FIG. 4 obtained by Inequality (1) that the length of the object per dot in the image captured by the image sensor 34 falls within 0.03 mm. Accordingly, when the imaging unit 30 is disposed within an object distance D of 90 mm, the machining point P can be observed on a typical display screen having the 16:9 aspect ratio at a resolution equal to or higher than that of visual observation.

When the number of dots Rsa on the long side of the image picked up by the image sensor 34 is 1920 or 3840, even if the object distance D becomes 100 mm, the length of the object per dot in the image picked up by the image sensor 34 falls within 0.03 mm, so that the machining point P can be observed at a resolution equal to or higher than that of visual observation.

FIGS. 5 to 9 show the calculation results when the parameters in Inequality (1) are appropriately changed. Specifically, in FIG. 5, the length of the object per dot in the image is calculated using Inequality (1) when the field angle θ is fixed at 30 [deg], the ratio between the long side and the short side of the image captured by the image sensor 34 is fixed at 1:1, and the number of dots Rsa on the long side of the image and the object distance D are varied.

In FIG. 6, the length of the object per dot in the image is calculated using Inequality (1) when the field angle θ is fixed at 45 [deg], the ratio between the long side and the short side of the image captured by the image sensor 34 is fixed at 16:9, and the number of dots Rsa on the long side of the image and the object distance D are varied.

In FIG. 7, the length of the object per dot in the image is calculated using Inequality (1) when the field angle θ is fixed at 45 [deg], the ratio between the long side and the short side of the image captured by the image sensor 34 is fixed at 1:1, and the number of dots Rsa on the long side of the image and the object distance D are varied.

In FIG. 8, the length of the object per dot in the image is calculated using Inequality (1) when the field angle θ is fixed at 60 [deg], the ratio between the long side and the short side of the image captured by the image sensor 34 is fixed at 16:9, and the number of dots Rsa on the long side of the image and the object distance D are varied.

In FIG. 9, the length of the object per dot in the image is calculated using Inequality (1) when the field angle θ is fixed at 60 [deg], the ratio between the long side and the short side of the image captured by the image sensor 34 is fixed at 1:1, and the number of dots Rsa on the long side of the image and the object distance D are varied.

The illuminator 36 illuminates the machining point P with light. The illuminator 36 may emit light from itself and irradiate the light or may conduct light emitted from a light source outside the imaging device 18. In the case of emitting light from itself and irradiating the light, examples of the illuminator 36 include a point light source LED (light emitting diode) and others. In the case of illuminating an object with light emitted from a light source outside the imaging device 18, examples of the illuminator 36 include a distal end of optical fibers that are optically connected to a light source outside the imaging device 18 and arranged in the tube of the imaging unit 30, passing through the tube of the supporting part 40, and a window through which light emitted from the distal end of the optical fibers is output to the outside.

The illustration of FIG. 3 shows a case where the illuminator 36 emits light from itself and illuminates an object with the light. In this case, the signal line of the illuminator 36 is connected to the control device 20 through the tube of the imaging device 18. The control device 20 may control the illuminator 36 so as to change the intensity of light emitted from the illuminator 36.

The supporting part 40 (see FIG. 2) supports the imaging unit 30 and is fixed to the tool support 16. As described above, the tool support 16 is placed on the tool table 12*b* that can move in a direction away from the workpiece WK (front direction) or in a direction approaching the workpiece WK (rear direction). Therefore, the imaging device 18 with its supporting part 40 fixed to the tool support 16 moves together with the tool TL supported by the tool support 16. That is, even if the tool table 12*b* moves or the rotary table 12*c* rotates, the relative position between the tool TL provided on the tool support 16 and the imaging device 18 will not change. As to the movement of the rotary table 12*c*, the rotary table 12*c* does not need to continuously rotate, as long as it can rotate within a certain angle range.

At least part of the supporting part 40 has an adjusting mechanism 42 allowing for adjustment of the orientation of the imaging unit 30. Examples of the adjusting mechanism 42 include a bellows tube that has concavities and convexities alternately formed on the tube wall of the supporting part 40 along the longitudinal direction thereof so as to be flexed by an external force. In the present embodiment, an actuator 44 that actuates the adjusting mechanism 42 and an actuation controller 46 that controls the actuator 44 are provided. For example, the actuator 44 is provided in the pipe of the supporting part 40, and the actuation controller 46 is provided in the control device 20.

The actuation controller 46 holds a database in which at least one of the type, the size and the length of the tool TL is associated with the position (front end position) of the imaging unit 30 relative to the machining point P. The actuation controller 46 confirms the position of the imaging unit 30 relative to the machining point P based on this database and the type of the tool TL specified by the machining program. When confirming the position of the imaging unit 30 relative to the machining point P, the actuation controller 46 controls the actuator 44 so that the imaging unit 30 moves to the confirmed position. Thereby, even if tool TL is replaced, the relative position between the process point P and the imaging unit 30 can be kept in substantially the same position.

Further, when the machining point P designated by the machining program changes, the actuation controller 46 controls the actuator 44 so that the imaging unit 30 follows the machining point P. Thus, even if the machining point P changes, the machining point P can be continuously captured.

MODIFIED EXAMPLES

Though the above embodiment has been described as one example of the present invention, the technical scope of the invention should not be limited to the above embodiment. It goes without saying that various modifications and improvements can be added to the above embodiment. It is also apparent from the scope of claims that the embodiment added with such modifications and improvements should be incorporated in the technical scope of the invention. Examples in which the above embodiment is modified or improved will be described below.

Modified Example 1

In the above embodiment, the imaging device 18 is fixed to the tool support 16 that is a tool support for supporting the tool TL. However, the imaging device 18 may be fixed to the tool table 12b or the rotary table 12c, which is a moving mechanism capable of moving the tool support 16.

Modified Example 2

In the above embodiment, the precision machine tool 10 is a lathe machine that performs machining by bringing the rotating workpiece WK into contact with the fixed tool TL. However, the precision machine tool 10 may be a machining center that performs machining by bringing the rotating tool TL into contact with the fixed workpiece WK.

When the precision machine tool 10 is a machining center, the tool support is a spindle head. In this case, the imaging device 18 is arranged on the spindle head or a moving mechanism that can move the spindle head. That is, the imaging device 18 may be fixed to a member whose relative position to the tool TL does not change.

Modified Example 3

In the above embodiment, one imaging device 18 is fixed to the tool support 16. However, a plurality of imaging devices 18 may be fixed to the tool support 16. When multiple imaging devices 18 are fixed to the tool support 16, the above Inequality (1) may be satisfied for at least one of the plurality of imaging devices 18.

It should be noted that at least one of the angle of view of the objective lens 32 of the imaging unit 30 and the number of effective pixels of the image sensor 34 of the imaging unit 30 may be different from one imaging device 18 to another. In addition, at least one of the angle of view of the objective lens 32 of the imaging unit 30 and the number of effective pixels of the image sensor 34 of the imaging unit 30 may be different from at least one imaging device 18 to the others of the multiple imaging devices 18.

When multiple imaging devices 18 are fixed to the tool support 16, the control device 20 may display at least an image including the machining point P captured by at least one of the multiple imaging devices 18 and an enlarged image of a specified region in each of the multiple captured images, on the same screen of the display unit 22 or alternatively on separate screens of the display unit 22.

Modified Example 4

In the above embodiment, the orientation of the imaging unit 30 is automatically adjusted by the actuation controller 46 controlling the adjusting mechanism 42 through the actuator 44. However, the operator may adjust the orientation of the imaging unit 30 manually while observing the display unit 22. Alternatively, the operator may give commands for adjusting the orientation of the imaging unit 30 to the actuation controller 46 via an input unit while observing the display unit 22 so that the actuation controller 46 adjusts the orientation of the imaging unit 30 based on the commands.

Modified Example 5

In the above embodiment, the actuation controller 46 confirms the position of the imaging unit 30 relative to the machining point P based on the database and the type of the tool TL specified by the machining program. However, the actuation controller 46 may confirm the position of the imaging unit 30 relative to the machining point P based on the database and the type of the tool TL input through the input unit by the operator.

Modified Example 6

The imaging unit 30 may include a communication unit for wireless communication with the control device 20 so as to transmit the images captured by the image sensor 34 to the control device 20 by means of the communication unit. Additionally, the imaging unit 30 may have a battery that supplies electric power for driving the imaging unit 30.

Modified Example 7

The above embodiment and modified examples may be arbitrarily combined as long as no technical inconsistency occurs.

[Technical Ideas]

The technical ideas that can be grasped from the above-described embodiment and modified examples will be described below.

The present invention is a precision machine tool (10) that uses a tool (TL) to perform precision machining on a workpiece (WK) in accordance with a machining command including machining accuracy in the order of 10 nanometers or less. This precision machine tool (10) includes: a tool support (16) configured to support the tool (TL); a moving mechanism (12b, 12c) configured to move the tool support (16); and one or a plurality of imaging devices (18) fixed to the tool support (16) or the moving mechanism (12b, 12c), the imaging devices each having an imaging unit (30) configured to capture the image of a machining point (P) on the workpiece (WK) machined by the tool (TL).

In the precision machine tool (10), one or multiple imaging devices (18) are fixed to the tool support (16) or the moving mechanism (12b, 12c). Therefore, even if the tool support (16) moves as the moving mechanism (12b, 12c) is moved, the single or multiple imaging devices (18) can capture the image of the machining point (P) without changing the relative position of the imaging device (18) to the tool (TL) supported by the tool support (16). As a result, the operator can observe the machining point (P) without getting close to the machining point (P), which provides excellent safety.

At least one of the imaging devices (18) may be configured so as to satisfy Inequality (1), where D [mm] is the distance from a predetermined portion of the imaging unit (30) to the machining point (P), θ [deg] is the field angle of the imaging unit (30), x is the ratio of the short side to the long side of the image captured by the imaging unit (30) when the long side is defined as 1, and Rsa is the number of dots on the long side in the image. This configuration facilitates fine capturing of the image of the machining point (P). It should be noted that the ratio between the long side and the short side of the image may be 16:9.

The imaging unit (30) may include an illuminator (36) configured to illuminate the machining point (P) with light. This facilitates clear capturing of the image of the machining point (P).

At least one of the imaging devices (18) may be configured to have a flexible rod structure. This facilitates flexible arrangement of the imaging device (18) in the machining area.

At least one of the imaging devices (18) may include an adjusting mechanism (42) configured to adjust the orientation of the imaging unit (30). This facilitates flexible arrangement of the imaging device (18) in the machining area.

The precision machine tool (10) may further include: an actuator (44) configured to actuate the adjusting mechanism (42); and an actuation controller (46) configured to control the actuator (44), and the actuation controller (46) may control the actuator (44) in accordance with the type, the size, or the length of the tool (TL). With this configuration, even if the tool (TL) is replaced, it is possible to keep the relative position of the machining point (P) to the imaging unit (30) in the same way.

The actuation controller (46) may be configured to control the actuator (44) so that the imaging unit (30) follows the machining point (P) when the machining point (P) designated by the machining command of the machining program changes. This configuration makes it possible to continuously track or follow the machining point (P) even if the machining point (P) is changed.

The precision machine tool (10) may further include a display unit (22) configured to display at least one of an image captured by at least one of the imaging units (30) of the imaging devices (18) and an enlarged image of a specified region in the image. This enables the operator to observe the machining point (P) without getting close to the machining point (P).

What is claimed is:

1. A precision machine tool that uses a tool to perform precision machining on a workpiece comprising:
    a tool support configured to support the tool;
    a moving mechanism actively coupled to the tool support wherein the moving mechanism moves the tool support;
    a controller operatively coupled to the tool wherein the controller is configured to provide machining commands to the tool according to a machining program for machining a workpiece with a machining accuracy in an order of 10 nanometers or less; and
    one or a plurality of imaging devices fixed to the tool support or the moving mechanism, wherein the one or a plurality of imaging devices each have an imaging unit that is operatively coupled to the controller to position the image unit to capture an image of a machining point specified by the machining program on the workpiece with respect to the tool, wherein each imaging unit comprises
        at least one objective lens located at a proximal end of the imaging unit;
        an image sensor located distal of the at least one objective lens,
    wherein the imaging unit is positioned to capture an image of the machining point having a length per pixel of 0.03 mm or less.

2. The precision machine tool according to claim 1, wherein at least one of the imaging devices is positioned with respect to the machining point so as to satisfy the following inequality:

$$\frac{2 \times D \times \tan\left(\frac{\theta}{2}\right)}{R_{sa}} \cdot \frac{1}{\sqrt{1+x^2}} \leq 0.03 \text{ [mm]}$$

where D [mm] is a distance from a portion of the imaging unit a front end of the imaging unit or a principal point of the objective lens in the imaging unit to the machining point, θ [deg] is a field angle of the imaging unit, x is a ratio of a short side to a long side of the image captured by the imaging unit wherein the image captured by the imaging unit is a rectangular area where the long side is defined as 1, and Rsa is a number of pixels on the long side in the image so that the machining point so that the machining point displayed on the display unit configured to be observed by the operator.

3. The precision machine tool according to claim 2, wherein the image captured by the imaging unit is displayed on a display screen of a display unit that has an aspect ratio of 16:9.

4. The precision machine tool according to claim 1, wherein the imaging unit includes an illuminator configured to illuminate the machining point with light.

5. The precision machine tool according to claim 1, wherein at least one of the imaging devices is configured to have a flexible rod structure.

6. The precision machine tool according to claim 1, wherein at least one of the imaging devices includes an adjusting mechanism that adjusts an orientation of the imaging unit.

7. The precision machine tool according to claim 6, further comprising:
    an actuator configured to actuate the adjusting mechanism; and
    an actuation controller configured to control the actuator, wherein the actuation controller is configured to control the actuator in accordance with a type, a size, or a length of the tool.

8. The precision machine tool according to claim 7, wherein the actuation controller is configured to control the actuator so that the imaging unit follows the machining point when the machining point designated by the machining command of the machining program changes.

9. The precision machine tool according to claim 1, further comprising a display unit to display at least one of an image captured by at least one of the imaging units of the imaging devices and an enlarged image of a specified region in the image.

* * * * *